United States Patent [19]

Jensen

[11] Patent Number: 5,035,962
[45] Date of Patent: Jul. 30, 1991

[54] LAYERED METHOD OF ELECTRODE FOR SOLID OXIDE ELECTROCHEMICAL CELLS

[75] Inventor: Russell R. Jensen, Murrysville, Pa.

[73] Assignee: Westinghouse Electric Corp., Pittsburgh, Pa.

[21] Appl. No.: 496,706

[22] Filed: Mar. 21, 1990

[51] Int. Cl.⁵ ............................................. H01M 8/12
[52] U.S. Cl. ...................................... 429/40; 429/44; 429/33; 204/291; 204/292
[58] Field of Search .................... 429/40, 44, 45, 30, 429/33, 193; 204/291, 292, 421; 252/182.1

[56] References Cited

U.S. PATENT DOCUMENTS

| 4,459,341 | 7/1984 | Marchant et al. | 429/33 |
| 4,490,444 | 12/1984 | Isenberg | 429/31 |
| 4,582,766 | 4/1986 | Isenberg et al. | 429/30 |
| 4,597,170 | 7/1986 | Isenberg | 29/623.5 |
| 4,598,028 | 7/1986 | Rossing et al. | 429/30 |
| 4,702,971 | 10/1987 | Isenberg | 429/31 |
| 4,767,518 | 8/1988 | Maskalick | 204/242 |

Primary Examiner—Anthony Skapars
Attorney, Agent, or Firm—Daniel P. Cillo

[57] ABSTRACT

A process for fabricating a fuel electrode comprising: slurry dipping to form layers which are structurally graded from all or mostly all stabilized zirconia at a first layer, to an outer most layer of substantially all metal powder, such an nickel. Higher performaance fuel electrodes may be achieved if sinter active stabilized zirconia doped for electronic conductivity is used.

4 Claims, 1 Drawing Sheet

LAYERED METHOD OF ELECTRODE FOR SOLID OXIDE ELECTROCHEMICAL CELLS

GOVERNMENT CONTRACT

The Government of the United States of America has rights in this invention pursuant to Contract No. DEAC-0280-ET-17089 awarded by the U.S. Department of Energy.

BACKGROUND OF THE INVENTION

The present invention relates to electrodes for solid oxide electrochemical cells and more specifically to a method of fabricating electrodes on solid oxide electrochemical cells by sintering. In this case, electrochemical cells include fuel cells, electrolyzers and sensors that operate on the basis of electromotive force measurement and/or current measurement and which comprise a solid oxide electrolyte and attached electrodes. Solid oxide fuel cells are one typical field of application of this invention. Although this invention was developed specifically for the fabrication of electrodes on fuel cells, it may also be used to fabricate electrodes on a variety of other electrochemical devices.

DESCRIPTION OF THE PRIOR ART

Solid oxide fuel cells are high temperature electrochemical devices fabricated primarily from oxide ceramics. Typically, they contain an oxygen ion conducting solid electrolyte, such as stabilized zirconia. The electrolyte is usually a thin dense film which separates two porous electrodes an anode and a cathode. The cathode, which is maintained in an oxidizing atmosphere, is usually an oxide doped for high electrical conductivity, such as strontium doped lanthanum manganite. The anode, on the other hand, is maintained in a reducing atmosphere and is usually a cermet such as nickel-zirconia. Finally, an interconnection is usually employed which is a dense, electronically conducting oxide material which is stable in both reducing and oxidizing environments, such as doped lanthanum chromite. The interconnection is deposited on a cell as a thin gas tight layer in such a manner that it permits the anodes and cathodes of adjacent cells to be electrically connected in series. The gas-tightness of the interconnection, in combination with that of the electrolyte, insures that the entire cell is gas-tight, preventing mixing of the anode and cathode atmospheres.

Solid oxide cells can be operated in either an electrolysis mode or in a fuel cell mode. In an electrolysis mode, DC electrical power and steam or carbon dioxide or mixtures thereof are supplied to the cell which then decomposes the gas to form hydrogen or carbon monoxide or mixtures thereof, as well as oxygen. In the fuel cell mode, the cell operates by electrochemically oxidizing a gaseous fuel such as hydrogen, carbon monoxide, methane or other fuels to produce electricity and heat.

The use of nickel-zirconia cermet anodes for solid oxide electrolyte fuel cells is well known in the art, and taught, for example, by A. 0. Isenberg in U.S. Pat. No. 4,490,444. The anode must be compatible in chemical, electrical, and physical-mechanical characteristics such as thermal expansion, to the solid oxide electrolyte to which it is attached. A. 0. Isenberg, in U.S. Pat. No. 4,597,170 solved bonding and thermal expansion problems between the anode and solid oxide electrolyte, by use of a skeletal embedding growth, of for example, primarily ionically conducting zirconia doped with minor amounts of yttria. The skeletal growth extends from the electrolyte/anode interface into a porous nickel layer, with the composite structure comprising the porous cermet anode.

Anchoring of the porous nickel anode to the solid oxide electrolyte was accomplished by a modified electrochemical vapor deposition (EVD) process. While this process provided well bonded anodes, having good mechanical strength and thermal expansion compatibility, gas diffusion overvoltages were observed during operation, lowering overall cell performance.

In order to reduce gas diffusion overvoltages, A. 0. Isenberg et al., in U.S. Pat. No. 4,582,766, taught oxidizing the nickel in the cermet electrode to form a metal oxide layer between the metal, and the electrolyte, the embedding skeletal member. Subsequent reduction of the metal oxide layer forms a porous metal layer between the metal, and the electrolyte and skeletal member allowing greater electrochemical activity. The EVD process, while producing acceptable quality electrodes is labor-intensive. What is needed is a low cost process for the fabrication of active anode structures in order to eliminate the need for electrochemical vapor deposition.

It is an object of the present invention to provide a method of sintering a fuel cell electrode.

It is another object of the present invention to provide a method of making a fuel cell electrode by depositing layers of nickel-yttria stabilized zirconia and then sintering the layers to the fuel cell.

These and other objects of the present invention will be more fully understood from the following description of the invention.

SUMMARY OF THE INVENTION

The above problems have been solved and the above needs have been met by providing a process for sintering fuel electrodes on solid oxide fuel cells (SOFC).

For reasons of cost reduction and increased cell performance, an alternative to electrochemical vapor deposition (EVD) has been developed for fuel electrode fabrication. A sintering process has been developed which is significantly less expensive than EVD. In addition, the microstructure of a sintered fuel electrode is more amenable to modification and control, allowing the performance of a cell to be optimized.

Specifically, the process involves sintering a mixture of nickel and yttria stabilized zirconia onto the electrolyte of a cell. The major problems in fabricating an anode by sintering are developing adequate adhesion to the cell and sufficient electrical conductivity in the electrode. A mixture of nickel and yttria stabilized zirconia which has a high zirconia content will adhere to the yttria stabilized zirconia electrolyte because the zirconia in the mixture will bond to the electrolyte during sintering, mechanically attaching the electrode. On the other hand, a high zirconia content mixture has an unacceptably low electrical conductivity after sintering. A mixture of nickel and yttria stabilized zirconia which has a high nickel content does have sufficient electrical conductivity after sintering, but will not adhere well to the electrolyte of a cell.

These problems are overcome by fabricating the electrode such that it has a composition graded from being high in zirconia at the interface between the electrode and the electrolyte to being high in nickel at the external surface of the electrode. Accordingly, when the cell is subjected to a high temperature sintering operation, the high zirconia composition at the electrolyte interface bonds the electrode to the cell while the high nickel composition at the external surface become electrically conducting.

In practice, an electrode with a graded composition structure is fabricated approximately by successively depositing layers of nickel-yttria stabilized zirconia mixtures with different compositions. A convenient method for applying the layers is a slurry dip application comprising: applying an inner layer of a slurry substantially of stabilized zirconia to an electrochemical cell; applying at least one layer of a slurry of a mixture of stabilized zirconia and metal powder selected from the group consisting of nickel, palladium, platinum and cobalt to said first layer; applying an outer layer of a slurry substantially of metal powder selected from the group consisting of nickel, palladium, platinum and cobalt; and sintering said layers to form an electrode.

BRIEF DESCRIPTION OF THE DRAWINGS

In order that the invention can be more clearly understood, conventional embodiments thereof will now be described, by way of example, with reference to the accompanying drawings, in which.

DETAILED DESCRIPTION OF THE PREFERRED EMBODIMENTS

Figure 1:
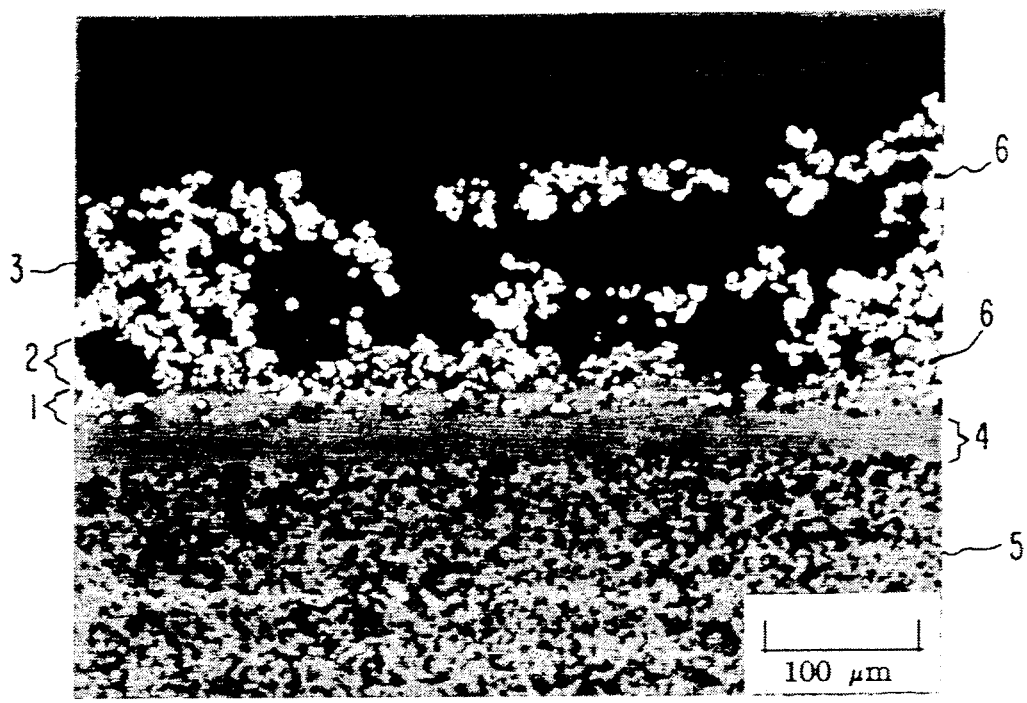
FIG. 1 is an optical micrograph of a cross-section of the structure of a fuel cell electrode prepared by the multiple layer slurry method.

For purposes of convenience, references to zirconia and to yttria stabilized zirconia mean stabilized zirconia in which the stabilizing agent is a divalent or trivalent cation species. Particularly useful stabilized zirconia includes calcia stabilized zirconia, magnesia stabilized zirconia, yttria stabilized zirconia, or other such species. The metallic component of the electrode is preferably nickel, however, any metal with a melting point in excess of the temperature used in sintering the anode may be used. Suitable metals include metals from Group VIII of the Periodic Table of Elements, such as palladium, platinum, cobalt and the like. Nickel shall be used throughout the specification in order to simplify description, but the invention is not limited to nickel.

The anode of a solid oxide fuel cell performs two main functions. First, it acts as an electron current collector (or distributor of electrons if the fuel cell is operated in the electrolysis mode). The electrode must collect the electrons liberated during the electrochemical oxidation of the fuel and provide a low resistance path for electron current flow to either a series connected fuel cell or an external power lead. To obtain the lowest electrode resistance and maximum power from a fuel cell, the current collector within an anode should be metallic.

The second important function of the anode is to provide sites where the electrochemical oxidation (or reduction if the fuel cell is operated in the electrolysis mode) of the fuel can occur. The microstructural requirements of such sites are stringent. They are locations within the anode where oxygen ions delivered by the electrolyte, gaseous fuel from the fuel stream and an electronic path to the electron current collector are simultaneously in contact.

The sintered anode of the present invention possesses numerous sites where open porosity (accessible by fuel from the fuel stream) is in contact with both the sintered yttria stabilized zirconia and nickel. Because the yttria stabilized zirconia in the anode is in contact with the electrolyte and the nickel is electrically conducting, these three phase sites are electrochemically active. Thus, anode fabrication by sintering mixtures of yttria stabilized zirconia and nickel provides a method for the fabrication of fuel cells with performance at least comparable to that of prior art fuel cells.

The process of the present invention is based on the deposition of multiple anode layers on the electrolyte of a fuel cell using nickel-yttria stabilized zirconia slurries of different compositions. The compositions of the individual layers are such that the multiple layer structure approximates one in which the composition is continuously graded from being high in zirconia at the electrolyte interface to being high in nickel at the external surface of the electrode. Such an electrode structure is preferred to meet the simultaneous requirements of adhesion to the yttria stabilized zirconia electrolyte and adequate electrode electrical conductivity.

To achieve adequate electrical conductivity, a relatively high nickel to zirconia ratio in the electrode layer is preferred. This ratio allows the nickel powder particles in the layer to sinter to each other and develop a continuous electrical conduction path through the electrode. The zirconia is desirable in order to prevent further gross sintering of the nickel during fuel cell operation. High nickel to zirconia ratio layers will not adhere directly to a yttria stabilized zirconia electrolyte, however. This problem can be overcome by the use of one or more intermediate layers with compositions having higher zirconia to nickel ratios.

The composition of each of these layers can be chosen so that after sintering, it will adhere to the layers immediately above and below it in the electrode structure. In particular, the lowermost intermediate layer, which is in contact with the electrolyte, has the highest zirconia content and is capable of bonding to the electrolyte. Although the intermediate layers can adhere to the electrolyte of a fuel cell, they cannot in themselves function as an anode because they have unacceptably low electrical conductivities. Accordingly, the first layer applied to the electrolyte should preferably have a composition high in zirconia to promote adhesion to the electrolyte. The zirconia content of the overlying layers should preferably be reduced successively in such a way that adequate interlayer bonding is achieved and that the final layer has a high electrical conductivity. It is preferred, based on safety considerations, that the anode slurries be aqueous. Organic based slurries may also be expected to work.

Although anode nickel and zirconia powder are in the anode slurries, only the degree of dispersion of the zirconia powder is important. No dispersant is added specifically to disperse the nickel powder. Some flocculation of the nickel particles in the wet slurries is actually beneficial in increasing the electrical conductivity of the electrode layer. Various dispersants such as polyelectrolytes (anionic or cationic surfactants), long chain neutral polymers, and the like may be used to deflocculate the zirconia. These dispersants can be used in one or more of the layers, if desired. The zirconia may also be dispersed by adjusting the pH of the slurries. If acid pH adjustment is used, however, the shelf life of the slurries is relatively short due to dissolution of the nickel in the acidic slurries which causes their pH to rise.

A binder, such as polyvinyl alcohol, acrylic polymer emulsions, cellulose ethers, and the like, is added to the slurries to prevent drying cracks in the unsintered or green electrode layers and to provide the green anode with sufficient strength and adherence to be handled. These binders can be used in one or more of the layers, if desired.

One of the keys to this sintering process is the use of yttria stabilized zirconia powder which can be sintered to complete or nearly complete density at a temperature of up to about 1350° C. for a time of up to about several hours. Because the anode is the last structure applied to a fuel cell, higher temperatures or longer times run the risk of damaging or altering the properties of the previously applied layers. Yttria stabilized zirconia powders which can be sintered under such conditions are commercially available.

Multiple coatings to build the desired anode structure may be applied sequentially using different slurries with the same binder and solvent system. The entire anode structure may be sintered in a single operation using relatively simple and inexpensive equipment in a nonexplosive reducing atmosphere at atmospheric pressure. The present anode layers can be applied to a cell by a slurry dip process. However, any suitable application means may be used, including, for example, spraying, lamination of tape cast electrode materials and the like.

In addition to being a potentially low-cost process, the ability to fabricate anodes by sintering presents an important advantage in that the composition and structure of the anode may be tailored to a greater degree than is possible in fabrication by EVD. For instance, the zirconia infiltrated into the electrode does not necessarily have to be a purely ionically conducting stabilized zirconia, but could be some suitably doped mixed electronically-ionically conducting stabilized zirconia. The use of mixed conductor zirconia in the anode increases fuel cell performance because the mixed conducting zirconia can then perform two functions, the delivery of the oxygen ions conducted through the electrolyte and conduction of electrons liberated in the electrochemical oxidation of the fuel to the current collector. This greatly reduces the geometrical constraints on the electrochemically active sites in the fuel electrode. In effect, the entire surface of the mixed conductor zirconia in contact with the fuel atmosphere becomes electrochemically active. Stabilized zirconia powders may be doped to give mixed ionic and electronic conductivity. Suitable dopants include cerium oxide, titanium oxide, chromium oxide, praseodymium oxide, mixtures thereof, and the like.

EXAMPLES

The multiple layer anode sintering process comprises three main steps-formulation of the nickelyttria stabilized zirconia slurries, application of the slurry layers onto a fuel cell and sintering of the coated cell. These steps are addressed below.

Slurry Formulation

The nickel-yttria stabilized zirconia slurries contain, in addition to nickel and zirconia, the suspension medium binder and a dispersant. When the electrode layers are to be applied by dipping, the preferred medium is water, as aqueous suspensions are desirable based on safety considerations. If the layers are to be applied by spraying, an organic medium with grater volatility is preferred, to allow the layers applied to a cell to set up quickly without dripping.

The nickel powder that is used has a filamentary particle morphology. Individual particles are composed of smaller, roughly equiaxed particles attached to each other to form a structure resembling beads on a string. Such powder is commercially available as, for example, INCO Type 287 nickel powder. This type powder is preferred because the structure inherent in the particles leads to a higher degree of porosity after sintering than is obtained using a more equiaxed morphology powder, such as INCO Type 123 nickel powder. In addition, the filamentary nature of the particles leads, at a given porosity, to greater interlinking between the particles than occurs with an equiaxed powder. Consequently, the electrical conductivity of the filamentary powder is higher after sintering.

To be able to sinter the multiple layer anode at as low a temperature as possible, the yttria stabilized zirconia powder should have a very small particle size. Such zirconia powders are available commercially. In developing this sintering process, TOSOH TZ-8Y 8 mole percent yttria stabilized zirconia was used. This powder is available with a specific surface area in excess of 20 $m^2/g$, making it highly sinterable at relatively low temperatures.

A binder in the anode slurries is required to prevent the coating from cracking during drying and to allow the coated cells to be handled. Many different types of water soluble binders exist which may be used. The particular binder used in the development of this process is a medium molecular weight, fully hydrolyzed grade of polyvinyl alcohol.

Finally, a dispersant for the zirconia is required to stabilize the suspension of zirconia in the slurries. Dispersing the zirconia is necessary to obtain a high unsintered or green density in the zirconia after the coatings dry. This facilitates sintering of the zirconia at the lowest possible temperature. Many suitable dispersants exist including polyelectrolytes and neutral polymers. The zirconia may also be dispersed by adjusting the pH of the slurries. This is only a marginal technique if acidic pH adjustment is employed. The nickel in the slurries dissolves at low pH, which reduces the amount of acid present in the slurries and leads to an increase in pH. The shelf lives of slurries containing an acid dispersant are short, of the order of several days.

A dispersant for the nickel in the slurries is generally not required. The nickel particle size is relatively large, of the order of 5 $\mu m$ to 10 $\mu m$, so that dispersants would not be markedly effective in maintaining these particles in suspension. Furthermore, metallic nickel sinters quite well under the conditions required to sinter the zirconia, so that increasing the sinterability of the nickel is not an issue. Finally, a degree of flocculation of the nickel particles is actually desirable because it structures the nickel particles in such a way that interparticle contacts are increased, which facilitates the development of electrical conductivity during sintering.

The slurries are prepared by first milling the zirconia powder in the binder solution containing the dispersant. The amount of dispersant and length of the milling time required to completely disperse the zirconia powder vary for different lots of powder. The degree of dispersion of the zirconia can be monitored indirectly via viscosity measurements. The concentration of binder in the binder solution is not critical. Binder concentrations of the type polyvinyl alcohol employed in the range of 3 wt. % to 10 wt. % can be used, with 6 wt. % being a preferred composition. Finally, the zirconia content in the binder solution is not critical as long as it is above some minimum value. This value varies depending on the slurry being formulated. The slurries are formulated by adding the appropriate amount of nickel powder to the zirconia-binder solution suspension to give the desired nickel to zirconia ratio. The minimum zirconia content in the binder solution is governed by achieving a slurry viscosity greater than or equal to some desired value. High viscosity slurries can be thinned by adding extra binder solution. For the highest zirconia content slurry (used/see below) the minimum zirconia content required in the zirconia-binder solution suspension is 50 weight percent (or about 15 volume percent) zirconia.

Application of Anode Layers

The green anode is fabricated by applying the slurry layers successively and allowing each layer to dry before application of the succeeding layer. In developing this process, aqueous slurry layers were applied by dip application, where a fuel cell is immersed in a slurry and then removed. The thickness of the layer applied to a cell is dependent on the viscosity of the slurry and the drying rate of the coating. The viscosity of the slurry controls the initial thickness of the coating. Thicker coatings are applied using higher viscosity coatings. Drying rate is important because a slower drying rate allows more of the initially applied coating to drip from a cell after application, which results in a thinner coating. The drying rate of a coating is determined by external variables, such as temperature and humidity and by the solids loading of the slurry. Solids loading is also important because, when starting with equal initial viscosities, the viscosity of a slurry with a higher solids loading will increase faster, due to evaporation of water from the coating, than that of a lower solids loading slurry. This leads to less dripping of the higher solids loading slurry and a thicker coating.

Functionally, the multiple layer anode may be categorized as having one or more intermediate layers which serve to attach to the electrolyte of a cell the final layer, which has the highest nickel content and consequently the highest electrical conductivity. Because the final layer is the primary electrical conducting component of the anode, it should be relatively thick. The intermediate layers should, however, be relatively thin since they are presently essential to promote adhesion between the final layer and the electrolyte.

The above considerations dictate that the slurries used for dip application of the intermediate anode layers should have relatively low viscosities and solids loadings Conversely, the slurry used for applying the final layer should have higher viscosity and solids loading. In addition, controlled environment drying is important in maintaining reproducibility in the thicknesses of the individual layers. An environment characterized by a temperature of 22° C. and a relative humidity of 50% has been used.

When green anode layers are applied to a fuel cell by dip application, control of the thickness of an individual layer is effected only indirectly through slurry viscosity, solids loading and drying conditions. In this regard, spray application of the anode layers would be preferred because coating thickness is more readily controlled. Spray applications would necessitate the use of slurries based on an organic medium with a significantly higher vapor pressure than water to ensure that the coatings dry quickly enough to avoid sagging.

A cell is prepared for application of the anode layers by masking the areas of the cell where electrode deposition is unwanted. A suitable masking material is water proof tape. The electrode layers are then applied over the entire external surface of the cell with the masking in place. After the final layer is dried, the masking tape can then be removed.

After each anode layer is applied to a cell, it must be allowed to dry completely. This is necessary because all of the electrode layer slurries are based on the same binder and slurry medium. If a layer was allowed off the cell by the application of the succeeding layer.

Sintering of the Green Anode

Once the green anode layers have been applied to a fuel cell, the cell must be sintered to generate an adherent, electrically conducting electrode. The preferred atmosphere for sintering is ambient temperature humidified nitrogen, which has a composition of approximately 98% $N_2$-2% $H_2O$. This atmosphere is preferred over a reducing atmosphere because it appears to provide an increased degree of adhesion. The humidified nitroge atmosphere is slightly oxidizing at the sintering temperatures used so that this effect is believed to be related to the formation of a thin nickel oxide layer on the nickel particles in the anode layers.

the humidified nitrogen sintering atmosphere is maintained during heating to the sintering temperature and during the hold time at the sintering temperature (sintering time). During cooling from the sintering temperature, hydrogen is added to the humidified nitrogen to give an atmosphere of the approximate composition 93% $N_2$-5% $H_2$-2% $H_2O$. Hydrogen is added at this point to ensure that any nickel oxide which formed is reduced to metallic nickel.

The sintering temperature for the anode can be in the range of 1250° C. to 1350° C., with sintering times varying inversely with temperature. The preferred sintering conditions are 1350° C. for 2 hr. Sintering at a lower temperature for a longer time is also expected to provide an acceptable electrode.

Demonstration of Concept

The feasibility of the multiple layer sintering process for anode fabrication was demonstrated using model specimens which closely simulate the electrolyte found on a fuel cell. Specifically, they comprise tubular porous stabilized zirconia tubes covered by thin films of dense EVD grown yttria stabilized zirconia. These tube sections were portions of actual fuel cells and were exposed to the same zirconia EVD conditions as the cell itself. Functionally, these tube segments are extensions of the porous support tubes on which cells are fabricated and are used to facilitate handling during processing. After processing, these sections are cut off the cells and discarded.

In developing this process, various combinations of different layer compositions were investigated. It was found that adherent, electrically conducting anodes may be obtained using three layers of different composition. Table 1 shows ranges for the compositions of the three layers which may be used. Preferred compositions are given in Table 2. The composition of the layer deposited directly on the electrolyte of a fuel cell (layer 1) does not have to be entirely zirconia to effect adequate adhesion to the electrolyte. Compositions for layer 1 given in Table 1 will provide adherent electrodes. Compositions for layer 1 with nickel fractions in the range of 50 vol. % and higher do not adhere to the electrolyte. This layer is made from a slurry substantially of $ZrO_2$, i.e., over about 70 vol. %. The preferred slurry for layer 2 is about 50 vol. % $ZrO_2$ and 50 vol. % Ni.

TABLE 1

ANODE LAYER COMPOSITIONS

| Layer | Composition* |
|---|---|
| 1 | 90 vol. % $ZrO_2$-10 vol. % Ni to 70 vol. % $ZrO_2$-30 vol. % Ni |
| 2 | 60 vol. % $ZrO_2$-40 vol. % Ni to 40 vol. % $ZrO_2$-60 vol. % Ni |
| 3 | 30 vol. % $ZrO_2$-70 vol. % Ni to 10 vol. % $ZrO_2$-90 vol. % Ni |

*Composition is given in terms of the volume fractions of zirconia and nickel relative to the total volume of nickel and zirconia. Volume occupied by porosity is not considered. The formula $ZrO_2$ is to be interpreted as meaning 8 mole percent yttria stabilized zirconia.

TABLE 2

PREFERRED ANODE LAYER COMPOSITIONS

| Layer | Composition* |
|---|---|
| 1 | 80 vol. % $ZrO_2$-20 vol. % Ni (73 wt. % $ZrO_2$-27 wt. % Ni) |
| 2 | 50 vol. % $ZrO_2$-50 vol. % Ni (40 wt. % $ZrO_2$-60 wt. % Ni) |
| 3 | 20 vol. % $ZrO_2$-80 vol. % Ni (14 wt. % $ZrO_2$-86 wt. % Ni) |

*Compositions are given in terms of the volume or weight fractions of zirconia and nickel relative to the total volume or weight of the nickel and zirconia. The volume fractions do not account for the porosity. The formula $ZrO_2$ is to be interpreted as meaning 8 mole percent yttria stabilized zirconia.

The compositions given in Tables 1 and 2 for layer 3, the final layer in the anode, represent a compromise between obtaining the highest electrical conductivity possible and a significant level of anode sintering resistance. High electrical conductivity requires that the amount of zirconia be reduced to a minimum. This permits the nickel to sinter significantly and develop strong interparticle contacts. Such an electrode layer would, however, continue to sinter during operation. Increasing the zirconia composition of the layer does impart sintering resistance. The composition for layer 3 given in Table 2 is preferred because it satisfies the conductivity and sintering resistance considerations reasonably well.

Finally, the compositions given in Tables 1 and 2 for layer 2, the middle layer in the electrode structure, are determined primarily by the constraint that this layer should bond well to layers 1 and 3.

Figure 2:
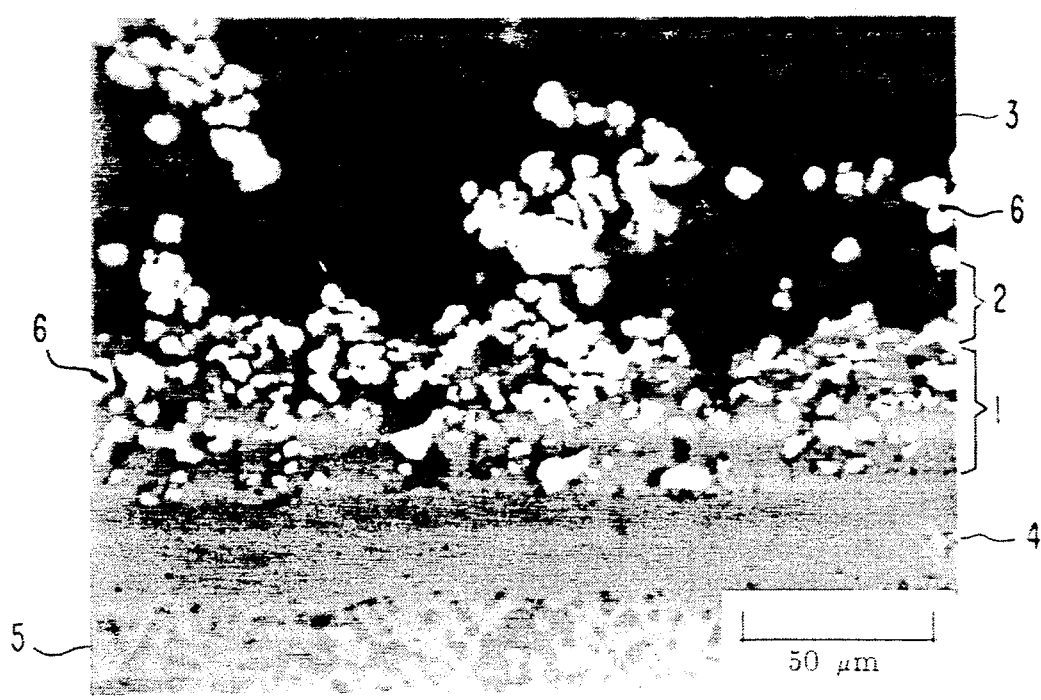
FIG. 2 is a magnified optical micrograph of the structure of FIG. 1.

FIG. 1 shows the microstructure of a sintered anode comprising three layers with compositions given in Table 2. The green anode layers were deposited using slurries in which the zirconia was dispersed using nitric acid. The slurries used to deposit layers 1 and 2 were formulated with low viscosities by using relatively high proportions of binder solution in these slurries. This was done to minimize the applied thicknesses of these layers. As shown in the structure of FIG. 1, and in the magnified structure of FIG. 2, the combined thickness of the first layer 1 and the second layer 2 is less than or equal to about 50 μm. A large number of voids are shown in the porous top layer 3.

In both figures, the electrolyte is shown as 4 and the air electrode structure as 5. Nickel is shown as particles 6. As discussed above, it is desirable to keep intermediate layers between the electrolyte and the final anode layer as thin as possible. The attainable thicknesses of these layers are limited by the presence of the nickel particles, however, to a minimum value determined by the average nickel particle size. A reasonable estimate for the minimum thickness might be a value equal to twice the average particle size. Accordingly, the minimum thickness that might be routinely achieved using a slurry containing a nickel powder with a particle size of 10 μm, such as was used in the slurries here, is about 20 μm. Accordingly, the microstructure of layers 1 and 2 is close to being optimal.

The thickness of layer 3 in the electrode shown in FIG. 1 is relatively high, so that most of the thickness of the electrode is accounted for by this layer. As discussed, this is desirable to maximize at a given electrode thickness, the electrical conductivity of the electrode.

Whereas particular embodiments of the invention have been described above for purposes of illustration, it will be appreciated by those skilled in the art that numerous variations of the details may be made without departing from the invention as described in the appended claims.

I claim:

1. A fuel electrode comprising:
   a) a first layer comprising substantially stabilized zirconia;
   b) a second layer, in intimate contact with said first layer, comprising a mixture of stabilized zirconia and metal powder selected from the group consisting of nickel, palladium, platinum and cobalt; and
   c) a third layer comprising substantially metal powder selected from the group consisting of nickel, palladium, platinum and cobalt.

2. The electrode of claim 1 where the metal powder is nickel powder.

3. The electrode of claim 1 where the zirconia contains dopants selected from the group consisting of cerium oxide, titanium oxide, chromium oxide, praseodymium oxide, and mixtures thereof, and the stabilized zirconia is selected from the group consisting of yttria stabilized zirconia, calcia stabilized zirconia and magnesia stabilized zirconia.

4. The electrode of claim 1 wherein said second layer is about a 50 vol. % $ZrO_2$ and about 50 vol. % nickel.

* * * * *